(12) United States Patent
Bowers et al.

(10) Patent No.: US 9,382,000 B1
(45) Date of Patent: Jul. 5, 2016

(54) AIRCRAFT DESIGN (71) Applicant: The United States of America as Represented by the Administrator of NASA, Washington, DC (US)

(72) Inventors: Albion H. Bowers, Lancaster, CA (US); Edward Uden, Barnstedt (DE)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 42 days.

(21) Appl. No.: 14/297,186

(22) Filed: Jun. 5, 2014

(51) Int. Cl.
B64C 3/14 (2006.01)
B64C 23/06 (2006.01)

(52) U.S. Cl.
CPC .............. *B64C 23/065* (2013.01); *B64C 3/14* (2013.01)

(58) Field of Classification Search
CPC ............. B64C 3/52; B64C 3/14; B64C 3/10
See application file for complete search history.

(56) References Cited

U.S. PATENT DOCUMENTS

| 6,722,615 | B2 * | 4/2004 | Heller et al. ............... 244/45 R |
| 6,970,773 | B2 | 11/2005 | Phillips |
| 7,883,060 | B2 * | 2/2011 | Phillips ....................... 244/203 |
| 8,123,160 | B2 * | 2/2012 | Shepshelovich et al. ... 244/45 R |

OTHER PUBLICATIONS

Ludwig Prandtl, NACA Report No. 116, 1920.
Nax Munk, NACA Report No. 120, 1920.
Ludwig Prandtl, On the Minimum Induced Drag of Wings, Zeitschrift fur Flugtecknik und Motorluftschiffahrt, 28 XII 1932.
Robert T. Jones, The Spanwise Distribution of Lift for Minimum Drag of Wings Having a Lift and a Given Bending Moment, NACA Technical Note 2249.

* cited by examiner

*Primary Examiner* — Tien Dinh
*Assistant Examiner* — Richard R Green
(74) *Attorney, Agent, or Firm* — Mark Homer (57) ABSTRACT The present invention is an aircraft wing design that creates a bell shaped span load, which results in a negative induced drag (induced thrust) on the outer portion of the wing; such a design obviates the need for rudder control of an aircraft.

13 Claims, 6 Drawing Sheets

AIRCRAFT DESIGN

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to aircraft design, specifically to aircraft wing design, and more specifically to aircraft wing design which would significantly increase aircraft efficiency and obviate the necessity for aircraft adverse yaw controls.

2. Description of the Related Art

When Wilbur and Orville Wright test flew gliders in 1900 and 1901, they discovered a problem with the control of their gliders. When they attempted to put in roll control, the wing they would increase the lift on would move backwards. In other words, the aircraft would roll one way, but it would yaw the opposite way, causing the gliders to crash. This is called adverse yaw, yawing the opposite direction to the roll command to turn. In 1902, the Wrights solved this problem by adding a rudder. The Wrights were awarded a patent for this design in 1906.

Current aircraft design includes two methodologies to control the adverse yaw identified by these aircraft pioneers. The first is the tail/rudder developed by the Wright brothers and the second is create devices at the wingtips that allow the aircraft to manipulate drag at the wing tips (split elevons at the tip like the B-2 Spirit aircraft, for example).

The wing designs of current aircraft that employ these types of yaw control are based, in part, on a paper published by Ludwig Prandtl in 1920 (NACA Report No. 116) which describes the theory called the Lifting Line, which becomes a mathematical tool by which the calculation of a wings' performance was first set forth. Other theories exist, but are too cumbersome to use, or too simplistic to be of value. Prandtl's Lifting Line is the first tool that provides meaningful results for wings. In this paper, Prandtl also introduces the concept of the elliptical span load as being the minimum induced drag for a given lift and a given wingspan.

Shortly thereafter Max Munk, Prandtl's student, published a paper, in NACA Report No. 120, that also describes a stagger biplane solution (often referred to as the stagger biplane report). This report describes that the elliptical span load results in a constant downwash behind the wing, and that the induced drag along the span of the wing is approximately elliptical as well.

In 1932, Prandtl published a paper on the minimum induced drag of wings, "Uber Tragflugel Kleinsten Induzierten Widerstandes" [this translates as: On the Minimum Induced Drag of Wings] (Zeitschrift fur Flugtecknik and Motorluftschiffahrt, 28 XII 1932; Munchen, Deustchland). In this paper, Prandtl attempts to determine a span load that uses the same amount of structure and produces the same lift, but has less induced drag than the elliptical span load. Prandtl uses the structure as the constraint, along with the lift by enforcing the same integrated wing bending moment of the elliptical on a new span load. Prandtl shows that this new span load produces a downwash at the centerline, but the downwash decreases moving outboard and becomes an upwash at the wing tip. Prandtl proposes that the wing planform be used to create this new span load (Prandtl refers to this wing design as the "sharp tipped wing") and that the new span load has 22% more span and 11% less induced drag than the elliptical span load, but the same lift and the same integrated wing bending moment (the same structure). Although the paper does not disclose this, it implies that the induced drag begins at the wing centerline, decreases moving outboard and becomes negative induced drag at the wing tips (negative induced drag is induced THRUST). Therefore, the span load contemplated is a bell shape, rather than elliptical.

In 1934, two teenage brothers, Walter and Reimar Horten, begin building a series of gliders that use Prandtl's proposed span load. Reimar Horten coins the term "bell shaped span load" for this shape. Over the next 20 years, they attempt to develop the idea. The Hortens never fully explain how to create the wings associated with the proposed bell shaped span load. Their work is documented in the book "Nurflugel" by Reimar Horten, Peter Selinger, and Jan Scott (H Weishaupt Verlag, 1993).

Robert T Jones of the NACA Ames Aeronautical Laboratory publishes a paper, NACA Technical Note 2249 "The Spanwise Distribution of Lift for Minimum Induced Drag of Wings Having a given Lift and a Given Bending Moment." This problem solution is nearly identical to the one Prandtl had solved 18 years earlier, but Jones was unaware of Prandtl's solution. Jones' solution also produced a bell shaped span load, a similar distribution of downwash/upwash (with induced thrust at the wingtips), and a similar distribution of induced drag as Prandtl's 1932 solution. Jones solution uses 26% more span, has 17% less induced drag, the same lift and the same wing root bending moment as the elliptical span load it is derived from. Jones also proposed to use planform to produce this new span load.

Although some of this early research described a potential for reducing induced drag on an aircraft wing by creating a bell shaped span load, little serious design and development work resulted from these theoretical findings, partly due to the impracticality of using planform to produce such a span load.

Finally, one recent technique has been developed to use twist distribution along the wing in order to minimize induced drag by varying the washout (U.S. Pat. No. 6,970,773). However, this technique employs a linear twist that still results in an elliptical span load and, therefore, does not provide yaw control without a standard rudder.

Therefore, it is desired to provide a wing design that can create a bell shaped span load, thereby reducing drag on the wing, without relying solely on planform techniques and, in addition, create yaw control without the need of a plane rudder or tail.

SUMMARY OF THE INVENTION

The invention proposed herein comprises an aircraft wing design that creates a bell shaped span load, which results in a negative induced drag (induced thrust) on the outer portion of the wing.

Accordingly, it is an objective of this invention to provide an aircraft wing design that significantly reduces induced drag on the wing, while maintaining lift and thrust.

It is another objective to provide an aircraft wing design that provides adverse yaw control, obviating the need for any separate adverse yaw control (such as a rudder).

This invention meets these and other objectives related to more efficient aircraft wing design by providing an aircraft that produces adverse yaw control without a rudder. This is accomplished by a wing design having a span load that changes from downwash to upwash at a location from about 60% to about 80% of the way from the aircraft centerline to the aircraft wingtips. Such a design comprises a total wing twist percentage of about 10 to about 30 times the aircraft's design lift coefficient. This total wing twist is nonlinear such that from about 10% to about 35% of the total wing twist occurs from the aircraft centerline to about halfway to the wing tip and the remainder of the total wing twist occurs along the remainder of the wing.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

The present invention is a novel aircraft design that provides yaw control without a rudder by creating a bell-shaped span load through a non-linear wing twist.

Almost all aircraft have vertical tails, or as a minimum they have some method of direct yaw control; so why don't birds have vertical tails or exhibit some method of direct yaw control? The present invention provides a wing design which is a direct analog to the wing of a bird, and, observationally, exhibits the same direct characteristics. The resulting flight behaves as birds do, and eliminates the need for a vertical tail.

Rudders have been a fact of life in aircraft design ever since because adverse yaw has been an accepted fact of aeronautic life. There have been flying wings since 1912 (aircraft without fuselages), and designers since then have occasionally sought to eliminate vertical surfaces altogether, but with little success; no matter what they do, designers have had to resort to one contrivance after another to deal with adverse yaw.

As a result, almost all aircraft have vertical tails, or at a minimum, have some method of direct yaw control; yet birds have no vertical tails and exhibit no method of direct yaw control. The present invention provides a wing that is analogous to the wing of a bird in that it has no vertical tail and exhibits no direct yaw control and, yet, is entirely controllable in flight.

In describing the invention herein, it should be understood that that certain aircraft are designed with two separate wings extending from a central aircraft body and others are designed with a "single" wing with the aircraft body attached below the centerline thereof. The present invention can be incorporated into any winged aircraft design and when discussing wings herein, the term "wings" both configurations (wherein the "single" wing configuration would merely be used as two separate wings originating from the "single" wing centerline).

The present invention provides a novel aircraft design employing wings that include a structural twist across each wing. The twist is strongly nonlinear. The wing twist increases the directional stability and directional damping of the aircraft. For example, if the aircraft flies in a sideslip, the trailing wing presents a larger area of twist to the oncoming air. This generates greater induced thrust compared to the leading wing, which has a smaller area exposed and generates a correspondingly smaller induced thrust, so the aircraft automatically corrects itself from the sideslip as though the aircraft had a vertical tail. Because a dynamic dutch-roll (trading yaw and pitch in a periodic cyclical motion) would also result in stronger thrust on the trailing tip and weaker thrust on the leading tip, the dutch-roll motion would quickly damp out. This results from the structural twist and would not occur in the case of a planform only bell shaped span load, as proposed by both Prandtl and Jones as discussed above.

Figure 1:
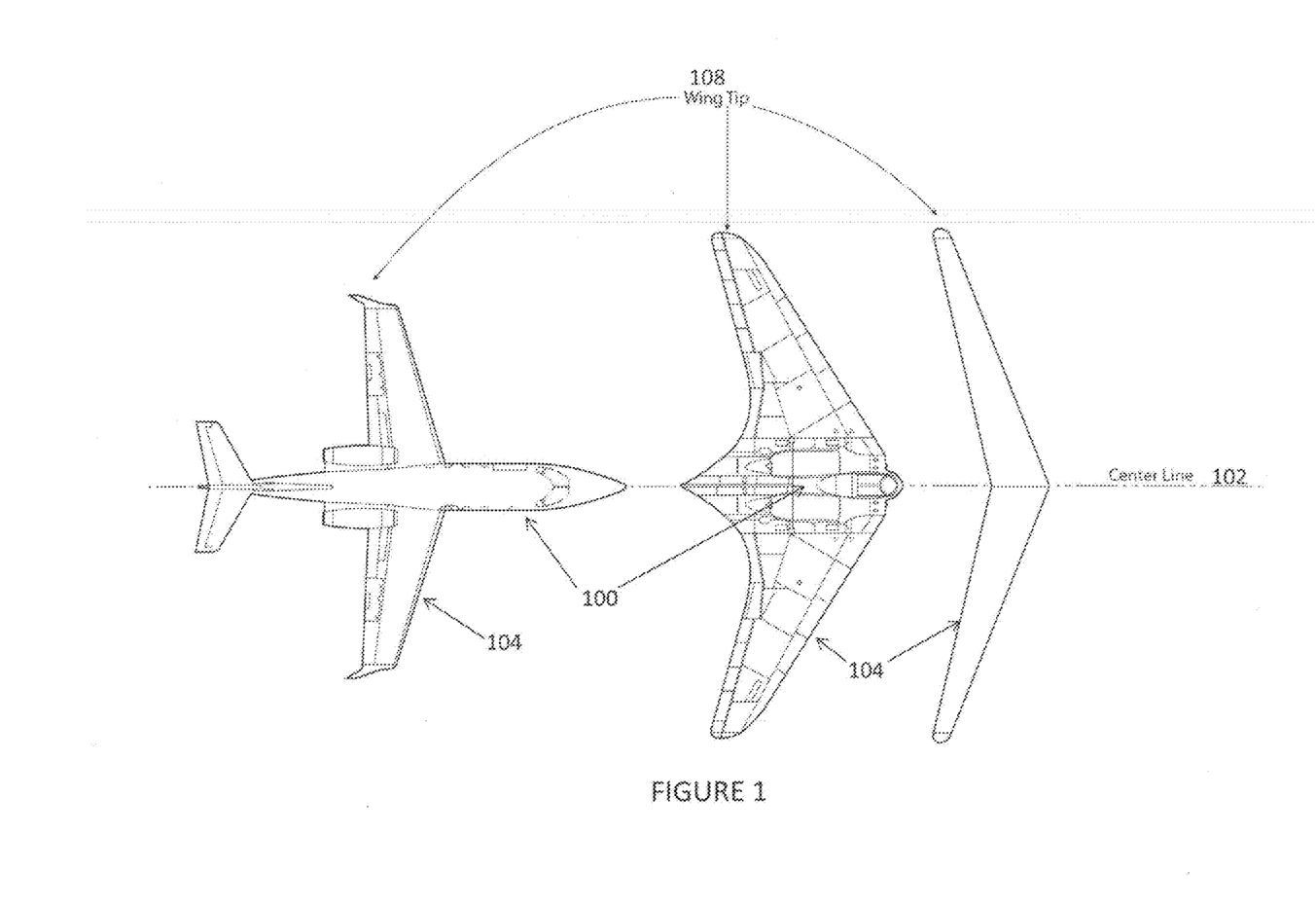
FIG. 1 depicts an aircraft incorporating the present invention.
Figure 2:
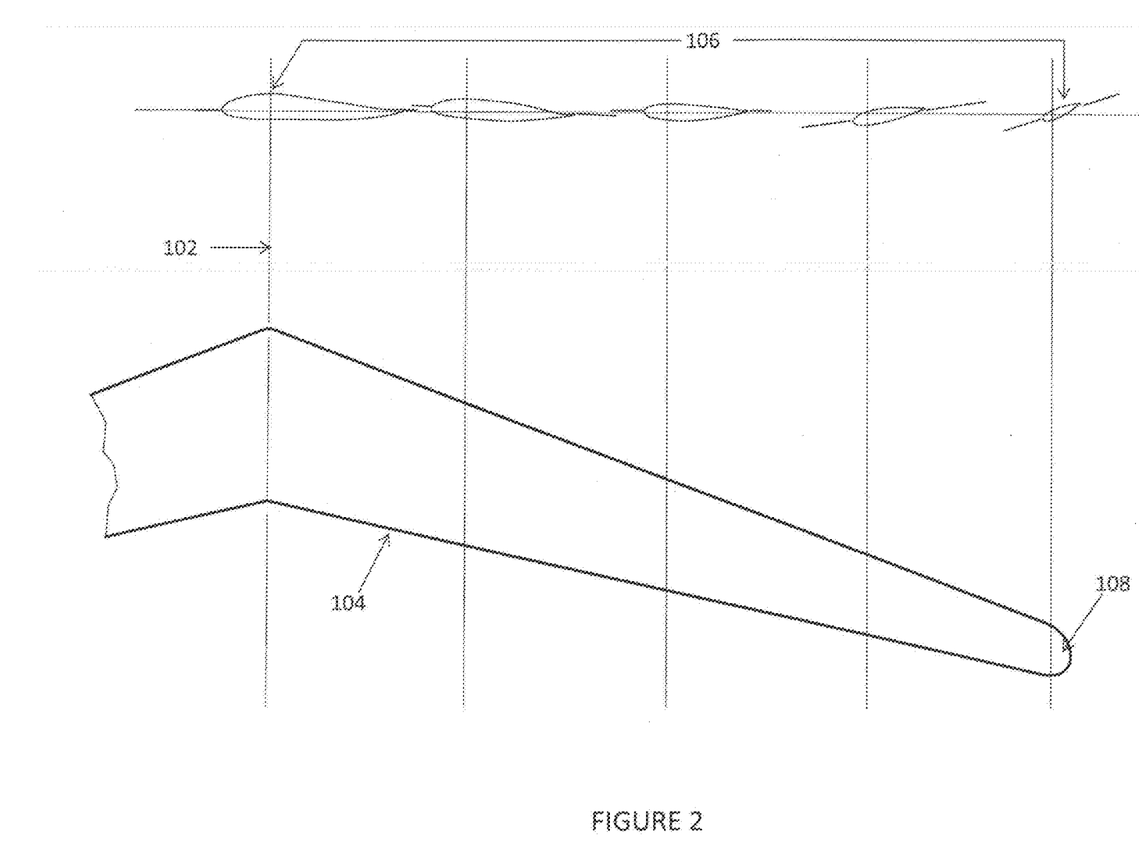
FIG. 2 depicts an aircraft wing from FIG. 1.

Referring to FIGS. 1 and 2, an aircraft body 100 comprises a centerline 102. Wings 104 extend from the aircraft body 100. A total wing twist 106 is applied to the wings 104.

The total wing twist 106 is very large by comparison with current aircraft designs. In general, the total wing twist comprises values well in excess of 10 degrees, while conventional wings as used now seldom have more than 2 degrees of twist. The wing twist 106 is also unusually nonlinear, with most of the twist occurring in the outboard part of the wing, near the wing tip 108; common practice is to use a linear wing twist.

For the present invention, it is only in the about the outer 20 to 40 percent of the wings span 104 that the induced thrust exists. It is necessary for the control surfaces for roll to be placed in this outer portion of span, near the wing tips 108. This is the region of negative induced drag (induced thrust) and the cross-over the flow to negative downwash (upwash). This is the inflection (about 60%-80% semispan) where the wing 104 vortex would roll-up.

In a preferred embodiment of the invention, use of a straight taper aft-swept wing 104, with small tips 108 (a large taper ratio), results in tips 108 that are very small. The amount of structural twist 106 is dictated by the design lift coefficient of the aircraft. The aspect ratio, the twist 106, the taper ratio, the wing 104 area, and the wing 104 mean aerodynamic chord all combine to create the characteristic flying qualities for the invention. The size of the aircraft/payload and the strength of the wings 104 dictate the resulting center of gravity location, and the wing 104 sweep then dictates the longitudinal stability. Preferably, the twist 106 will result in trim at the design point that coincides with the maximum lift-to-drag ratio (or with the desired design point).

The total wing twist 106 in degrees is about 10-30 times the design lift coefficient, with the total wing twist 106 being preferably 20 times the design lift coefficient. As an example, if an aircraft has a design lift coefficient of 0.6, the total wing twist would be about 12 degrees. The total wing twist 106 is the sum of the aerodynamic twist (the offset of the zero lift angle of attack due to selection of the airfoil) and the geometric twist (the twist of the wing as measured by the first point of the leading edge to the last point of the trailing edge).

Also, as noted above, the total wing twist 106 is strongly nonlinear. The twist 106 between the centerline 102 to about halfway to the wing tip 108 is only about 10 to about 35 percent of the total twist 106, and the remaining 65 to 90 percent of the twist 106 is in the last half of the wing 104 to the tip 108. In a preferred embodiment of the invention, the total wing twist 106 between the centerline 102 to about halfway to the wing tip 108 is 30 percent of the total wing twist 106. This total wing twist 106 results in wings 104 having a span load that changes from downwash to upwash at a location from about 60 to about 80 percent of the way from the centerline 102 to a tip of the wings 108.

The wings 104 can be designed with aspect ratios from as low as about 2 to any higher aspect ratio that can be built. From a practical perspective, the useful range of aspect ratios is from about 2 to about 60.

Any non-zero design lift coefficient can be used for the present invention. The design lift coefficient should be in a range of from about 0.05 to about 2.0 and more preferably from about 0.2 to about 1.0

While the wing 104 taper ratio can be any value for the invention to operate, the preferable range is from about 1.0 to 10.0 (that is the tip chord of the wing 104 is equal to the root chord down to the tip chord of the wing 104 being 10 times smaller than the root chord).

In addition, in a preferable embodiment of the invention the reduced induced drag can be matched by a corresponding reduction in profile drag/skin friction. This is accomplished by reducing the wing 104 area by the same amount as the induced drag reduction. Present aircraft designs emphasize that the drag coefficients, profile (cdp) and induced (cdi), need to be matched in order to achieve maximum lift to drag ratios, but this solution can be forced by changing the corresponding wing 104 area to force matching of the drag coefficients. In a preferred embodiment, the wing 104 area is reduced from a standard wing 104 area by about 5 to about 15 percent.

Also, it is preferable that a small amount of dihedral is used for the wing 104 designs to achieve lateral-directional stability. Low lateral-directional stability can be used if control augmentation is added. However, if the preference is to gain the maximum aeronautical performance, minimum structural weight, and maximum stability through static natural means, such artificial control means should only be used when necessary.

Below is a mathematical description to clarify certain aspects of the invention described above:

Given:

$$b = \text{wing span} \quad (1)$$

The coordinate system defines y=0 at the centerline and y=s at the right wing tip (it is the usual custom for aircraft coordinate systems to define y as positive out the right wing tip)

$$s = b/2 \quad (2)$$

the local wing chord is $l(y)$ and AR is the aspect ratio defined as:

$$AR = b^2/S \quad (3)$$

where S is the wing area (not to be confused with s, or lower case "s").

CL is the total wing lift coefficient, and $\alpha(y)$ is the local angle of attack Therefore:

$$\alpha(y) = 2CL/(\pi AR s^2)/[(s^2 - 2y^2) + (8\sqrt{(s^2 - y^2)})/(3\pi l(y))] \quad (4)$$

The above is given by the Prandtl Lifting Line Theory, and is a good approximation for wing sweeps not exceeding 20 degrees (a simple approximation can be used to improve the correlation for sweep, which we have linearized).

$$\alpha\_i(y) = \frac{1}{8\pi} \int_{-s}^{+s} \frac{dcl*1}{dy'}(y') \frac{dy'}{y-y'} dy' \quad (5)$$

This is the induced angle of attack from the lifting line theory of Prandtl. It allows calculation of the local upwash/downwash, the local induced drag, and the local angle of attack (the induced angle of attack).

$$l(y) = \frac{\gamma(y)}{2\pi[\alpha(y) - \alpha\_i(y)]} \quad (6)$$

where $\alpha$ is the angle of attack and the $\alpha\_i$ is the local angle of attack (or the local induced angle of attack).

The symmetrical bell shaped lift distribution is defined by:

$$\gamma\_s(y) = \frac{32}{3\pi AR} CL\left(1 - \frac{y^{\wedge}2}{s^{\wedge}2}\right) \sqrt{(s^{\wedge}2 - y^{\wedge}2)} \quad (7)$$

FIGS. 3 through 6 show graphical depictions of some of the aspects of the present invention where the left side of the depictions coincide with the centerline of the aircraft and the right side of the depictions coincide with the wing tips.

Figure 3:
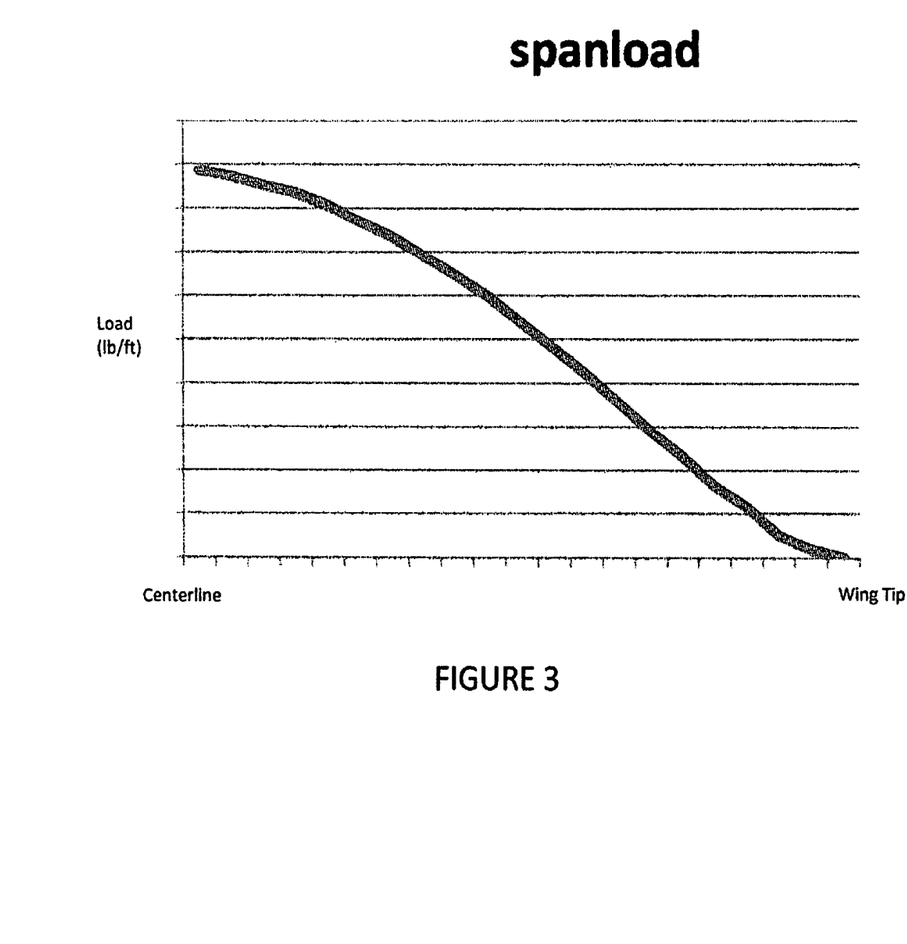
FIG. 3 depicts a graphical representation of a span load resulting from the present invention.
Figure 4:
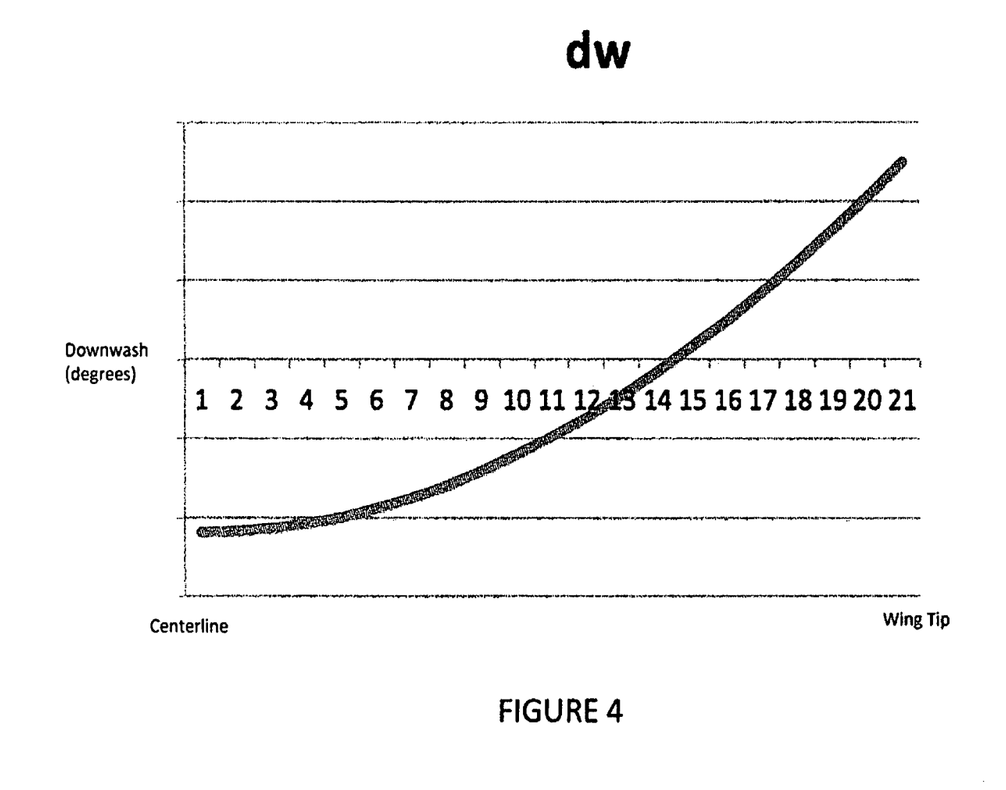
FIG. 4 depicts a graphical representation of downwash resulting from the present invention.
Figure 5:
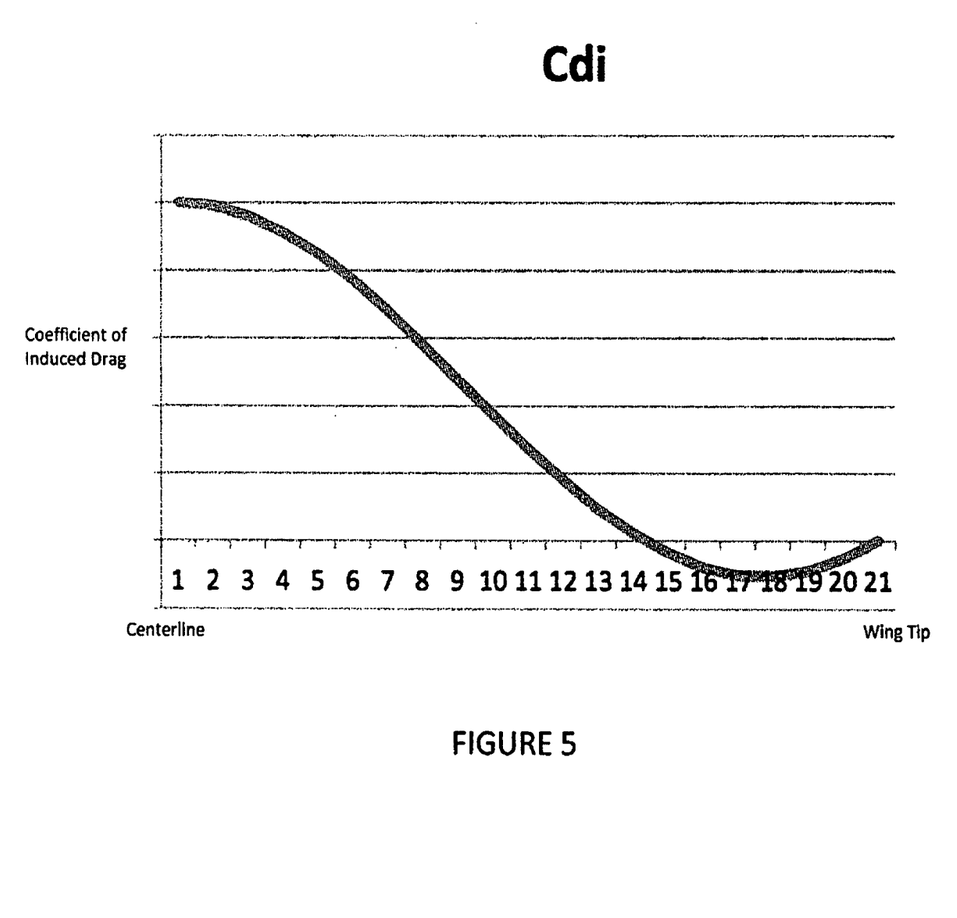
FIG. 5 depicts the induced drag coefficient across the wing of the present invention.
Figure 6:
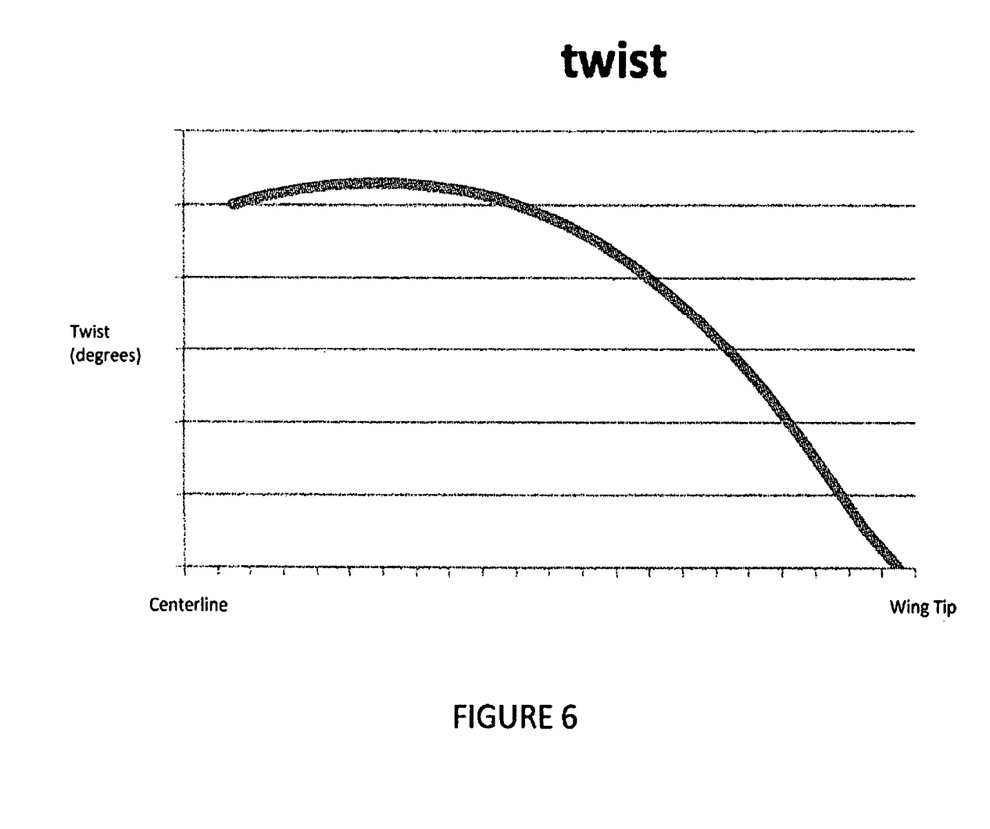
FIG. 6 depicts a graphical representation of the preferred total wing twist of the present invention.

FIG. 3 shows the span load of an aircraft incorporating the present invention. FIG. 4 shows the downwash related to an aircraft incorporating the present invention. The span is depicted using 21 stations and one can see that the downwash becomes negative (upwash) at around station 14 (at approximately 70% of the wing span). FIG. 5 shows the induced drag coefficient (Cdi) across the wing. This graph depicts that where the upwash exists (from FIG. 4), there is a negative induced drag (negative induced drag=induced thrust) which is located near the wing tip. Finally, FIG. 6 depicts the wing twist necessary to obtain the results depicted in FIGS. 3-5).

What is described herein are specific examples of many possible variations on the same invention and are not intended in a limiting sense. The claimed invention can be practiced using other variations not specifically described above.

What is claimed is:

1. An aircraft that provides adverse yaw control without a rudder, comprising:
   wings having a span load that changes from downwash to upwash at a location from about 60% to about 80% of the way from an aircraft centerline to a tip of the wings by providing a total wing twist percentage of about 10 times the aircraft's design lift coefficient to about 30 times the aircraft's design lift coefficient wherein from about 10% to about 35% of the total wing twist occurs from the centerline to about halfway to the wing tip and the remainder of the total wing twist occurs from about halfway to the wing tip to the wing tip.

2. The aircraft of claim 1, wherein the wings comprise an aspect ratio of from about 2 to about 60.

3. The aircraft of claim 1, wherein the design lift coefficient comprises from about 0.05 to about 2.0.

4. The aircraft of claim 3, wherein the design lift coefficient comprises from about 0.2 to about 1.0.

5. The aircraft of claim 1, wherein the wings comprises a taper ratio of from about 1.0 to about 10.0.

6. The aircraft of claim 1, wherein the wings surface comprises an area that is reduced from a standard wing area for a specific aircraft, employing a concept of approximating an elliptical span load, by about 5% to about 15%.

7. The aircraft of claim 1, wherein the location where wings' span load changes from downwash to upwash is about 70% from the centerline of the wing to the tip of the wing.

8. The aircraft of claim 1, wherein the total wing twist percentage comprises about 20 times the aircraft's design lift coefficient.

9. A method of providing adverse yaw control to an aircraft without a rudder, comprising the step of:

a rudder, comprising the step of:
   providing wings having a span load that changes from downwash to upwash at a location from about 60% to about 80% of the way from an aircraft centerline to a tip of the wings by providing a total wing twist percentage of the aircraft's wings that is about 10 to 30 times wherein from about 10% to about 35% of the total wing twist occurs from the centerline to about halfway to the wing tip and the remainder of the total wing twist occurs from about halfway to the wing tip to the wing tip.

10. The method of claim 9, wherein the wings comprise an aspect ratio of from about 2 to about 60.

11. The method of claim 9, wherein the design lift coefficient comprises from about 0.2 to about 1.0.

12. The method of claim 9, wherein the wings comprises a taper ratio of from about 1.0 to about 10.0.

13. The method of claim 9, wherein the wings surface comprises an area that is reduced from a standard wing area for a specific aircraft, employing a concept of approximating an elliptical span load, by from about 5% to about 15%.

\* \* \* \* \*